United States Patent [19]
Kieras et al.

[11] Patent Number: 6,129,880
[45] Date of Patent: Oct. 10, 2000

[54] METHOD OF FORMING A HEADED THERMOPLASTIC TUBE WITH A REUSABLE CLOSURE IN A SINGLE STEP

[75] Inventors: Ronald E. Kieras, Woodstock; John J. Rhoades, Poplar Grove, both of Ill.

[73] Assignee: Thatcher Tubes LLC, Woodstock, Ill.

[21] Appl. No.: 09/199,692

[22] Filed: Nov. 25, 1998

[51] Int. Cl.[7] .................... B29C 57/00; B29C 65/76; B29C 65/70; B29C 61/08; B29C 43/18

[52] U.S. Cl. ............... 264/230; 264/242; 264/249; 264/264; 264/268; 264/296; 264/322; 264/519; 264/911; 264/920; 425/393; 425/403; 425/515; 425/517

[58] Field of Search ............... 264/230, 242, 264/249, 264, 268, 296, 322, 327, 219, DIG. 41, 911, 920; 425/392, 393, 403, 503, 515, 517

[56] References Cited

U.S. PATENT DOCUMENTS

| | | | |
|---|---|---|---|
| 2,347,737 | 5/1944 | Fuller | 264/155 |
| 2,945,266 | 7/1960 | Mainardi | 264/277 |
| 3,047,910 | 8/1962 | Downs | 18/59 |
| 3,074,837 | 1/1963 | Flax | 156/69 |
| 3,226,464 | 12/1965 | Saumsiegle et al. | 264/325 |
| 3,286,010 | 11/1966 | Van Groningen | 264/242 |
| 4,123,312 | 10/1978 | Schmid et al. | 156/466 |
| 4,285,904 | 8/1981 | Ishimaru et al. | 264/322 |
| 4,377,248 | 3/1983 | Stull | 222/543 |
| 4,518,554 | 5/1985 | Hatakeyama et al. | 264/262 |
| 5,069,856 | 12/1991 | Holoubek et al. | 264/519 |
| 5,322,658 | 6/1994 | Holoubek et al. | 264/150 |
| 5,705,112 | 1/1998 | Gram | 264/242 |
| 5,758,788 | 6/1998 | Lifshey | 215/278 |

*Primary Examiner*—Jan H. Silbaugh
*Assistant Examiner*—Michael I. Poe
*Attorney, Agent, or Firm*—Armstrong, Westerman, Hattori, McLeland & Naughton

[57] ABSTRACT

A headed thermoplastic tube having a closure member is formed solely from a thermoplastic extruded, stretched sleeve by positioning the sleeve over a forming mandrel with an exposed portion and heating the exposed portion. The heated exposed portion is shaped into a head in a single step by contacting the exposed portion with a closure means which is later retained on the head after initial contact. The internal cavity of the closure means, which may have threads or grooves formed in the internal cavity, is made of an incompatible material to facilitate the forming of a head in said cavity. The closure means may also have tamper evident features.

22 Claims, 10 Drawing Sheets

METHOD OF FORMING A HEADED THERMOPLASTIC TUBE WITH A REUSABLE CLOSURE IN A SINGLE STEP

FIELD OF THE INVENTION

The present invention relates to a method of forming headed thermoplastic tubes with a reusable closure in one step.

BACKGROUND OF THE INVENTION

Thermoplastic tubes that are formed as squeeze tubes are extensively used in packaging of cosmetics, toothpaste, shampoos, and the like. These tubes are formed as tubular members having an open end at a first end and a threaded or other closure-acceptable head at the second end, with a closure used to seal the second end of the tube. The contents of the tube are charged to the tube through the first end. After filling, the first end of the tube is closed, such as by heat sealing, to complete the filled tube for sale.

A problem has existed in formation of such tubes in that the closure-acceptable head is usually formed separately from the tubular member and the provision of a complete seal between the head and tubular member must be assured.

One well known commercial method for producing such headed tubes is that disclosed in U.S. Pat. No. 3,047,910 to M. H. Downs. In this process, a tubular member is placed in a forming collar and a separate molten disc of thermoplastic material is forced into an open end of the tubular member while retained by the forming collar. The latent heat of the molten disc welds the peripheral edge of the disc to the inner circumferential wall of the tubular member and forms an end closure for the tubular member. Pressure is applied to the hot sealed end closure to shape a head into a desired shape and an orifice is then formed through the end of the closure. The head is then fitted with a threaded cap or other closure to provide a closed end tube ready for filling with the desired contents for the tube.

In methods such as that disclosed by the Downs patent, some difficulties remain, such as controlling the thickness and weight of the head and exact color matching of the tubular member and the head. The Downs process is not suitable for commercially preparing tubes from polycarbonates and polyvinyl chloride material. Also, any time two separate units such as a tubular member and a head are combined, a possible source of weakness exists at the juncture of the two. In addition, with such a juncture, a joint between the tubular member and head, a problem of providing a continuous barrier container is present where the tube contains a barrier material, such as an oxygen-barrier containing composite thermoplastic material.

There have been attempts in the past to produce thermoplastic squeeze tubes by extruding a thermoplastic tubing, cutting the tubing into sleeves or tubular members, heating one end of the sleeve to a molten mass and forming it into a head to make the thermoplastic tube. These methods have not been commercially successful because heat transfer is slow and the molten plastic is difficult to control. In such attempts, a sufficient amount of molten thermoplastic material is not accumulated on the end of the tube to form the desired head.

Forming headed thermoplastic tubes from thermoplastic extruded, longitudinally stretched sleeves has worked due in part to the workability of thermoplastic material when it is heated after having been extruded and longitudinally stretched. Such a process is described in U.S. Pat. No. 5,069,856, assigned to the assignee of the present invention and the contents of which are incorporated herein. The process employs the steps of heating a portion of a thermoplastic extruded, longitudinally stretched sleeve by a heat source inserted into an open end of the sleeve to a temperature above the glass transition temperature which causes die swelling (longitudinal shrinking and thickening) of the thermoplastic material and then applying pressure on the heated end of the sleeve by contacting the heated end with a molding die to form a headed thermoplastic tube.

OBJECTS OF THE INVENTION

The prior art process may be improved by forming the headed end of the thermoplastic tube in a reusable closure means instead of forming the headed end in die. It is therefore an object of the present invention to provide a method for forming a headed thermoplastic tube having a reusable closure on the head in a single step.

It is another object of the present invention to manufacture a thermoplastic tube having a head portion with a reusable closure that does not have any joint or juncture between the tubular portion of the tube and the head portion thereof.

It is yet another object of the invention to improve the manufacturing process of thermoplastic tubes by manufacturing a thermoplastic tube with a reusable closure means which functions as a mold for the neck or both the shoulder and neck when forming a head on the thermoplastic sleeve and also functions as a reusable threaded or snap seal cap for the finished thermoplastic tube.

It is still another object of the invention to manufacture a thermoplastic tube with a reusable closure means which has a feature which can function both as a tamper evident indicator and a means for securing the reusable closure means to the thermoplastic tube.

It is a further object of the invention to manufacture thermoplastic tubes with a variety of different shaped headed ends and thermoplastic tubes of various sizes.

Other objects, features and advantages of the present invention will become apparent from the following detailed description taken in conjunction with the accompanying drawings.

SUMMARY OF THE INVENTION

A method of forming a headed thermoplastic tube from an thermoplastic extruded, stretched sleeve is provided by positioning the sleeve over a forming mandrel with an exposed portion of the sleeve extending beyond a head forming end of the mandrel. The inner wall surface of the exposed portion of the thermoplastic sleeve is heated to a temperature above the glass transition temperature of the thermoplastic material to render the inner surface area molten, such as by use of a blast of hot air directed against the inner wall surface, while maintaining the outer surface of the sleeve below the glass transition temperature so as to provide support for the exposed portion of the sleeve and retain the cylindrical shape thereof. The heated exposed portion is then shaped into a conical shape, such as by directing hot air against the outer surface thereof. Pressure is then applied to the conical shaped exposed portion of the thermoplastic extruded sleeve by contacting the exposed portion with a reusable closure means to form a headed thermoplastic tube. The pressure applied to the conical shaped exposed end portion forces the same into a reusable closure means for the tube held in place by a holding or gripping member.

The thermoplastic extruded, stretched sleeve may be formed from a single thermoplastic material or the sleeve may be formed from a laminate or composite of a plurality of layers of materials, one layer of which may be an oxygen-impermeable material.

The tubes of the method of the present invention are formed solely from a thermoplastic extruded, stretched sleeve and have a tube body, shoulder, and neck, all of which are comprised of the thermoplastic material from which the sleeve was formed. The tubes of the method of the present invention also have a closure means which functions as a mold for the neck or both the shoulder and neck when forming a head on the thermoplastic sleeve and functions as a reusable seal for the finished thermoplastic tube.

The headed end of the thermoplastic tube and the reusable closure means on the headed end may be made in a variety of different shapes and sizes. Additionally, the reusable closure means may be made with a feature which can function both as a tapper evident indicator and a means for securing the reusable closure means to the thermoplastic tube.

BRIEF DESCRIPTION OF THE DRAWINGS

The present method will now be explained with reference to the accompanying drawings wherein like numerals indicate like parts throughout the drawings, and wherein.

DETAILED DESCRIPTION

The headed thermoplastic tubes produced according to the present method can be formed from various thermoplastic materials. Such thermoplastic materials include, but are not limited to, high density polyethylene, low density polyethylene, polypropylene, a polyester such as polyethylene terephthalate, polycarbonates, polyvinyl chloride, and the like. Headed thermoplastic tubes may also be produced from polyolefin blends. Table I shows some of the materials and blends that can be used for the thermoplastic tube in the method of the present invention. The dimensions are listed as examples of those that can be achieved.

TABLE I

| MATERIAL | DIMENSIONS | |
|---|---|---|
| | Wall Thickness (in) | Head Thickness (in) |
| Single Layer | | |
| LDPE | .014–.018 | .030–.040 |
| HDPE | .011–.015 | .030–.040 |
| PP | .014–.018 | .030–.040 |
| PET | .011–.015 | .030–.040 |
| 5-layer (outside layer to inside layer) | | |
| LDPE/A/EVOH/A/LDPE | .014–.018 | .030–.040 |
| HDPE/A/EVOH/A/HDPE | .011–.015 | .030–.040 |
| PP/A/EVOH/A/PP | .014–.018 | .030–.040 |
| 2-layer | | |
| LDPE/HDPE | .014–.018 | .030–.040 |
| HDPE/LDPE | .011–.015 | .030–.040 |
| PE blends | | |
| (single layer) | | |
| 80% LD/20% HD | .014–.018 | .030.–.040 |
| 60% LD/40% HD | .014–.018 | .030–.040 |
| 40% LD/60% HD | .011–.015 | .030–.040 |
| 20% LD/80% HD | .011–.015 | .030–.040 |

LEGEND: LDPE = low density polyethylene; HDPE = high density polyethylene; PP = polypropylene; PET = polyethylene terephthalate; EVOH = ethylene-vinyl alcohol; A = adhesive; PE = polyethylene; LD = low density; and HD = high density Additionally, plastic blends may be made from recycled thermoplastic tubes, i.e., post-consumer regrind.

The headed thermoplastic tubes may also be formed from multi layers or laminates of various plastic materials, such as a layer of an oxygen-impermeable material comprising a polyamide such as nylon, or ethylene polyvinyl alcohol, a polyvinylidene chloride or the like sandwiched between two polyethylene outer layers. Also, five layer composites comprising an outer layer and an inner layer of a thermoplastic such as polyethylene, polypropylene, a polyester such as polyethylene terephthalate, an intermediate layer of an oxygen-impermeable material, and adhesive layers between the oxygen-impermeable material and the outer and inner layers of thermoplastic to bond the same, can be used to form thermoplastic headed tubes according to the present method.

The thermoplastic headed tubes are formed from a flexible material and are readily squeezable and collapsible to force the contents of the tube out of an orifice formed in the end of the tube at the head portion. They are generally of a size having a wall thickness of the cylindrical portion of between about 0.010 to 0.040 inch in thickness preferably with a wall thickness of 0.010 to 0.020 inch, while a shoulder and a neck portion of the tube will be thicker than the wall of the sleeve, preferably between 0.030 and 0.050 inch thick. Since the tube is formed from an extruded sleeve, the wall thickness of the cylindrical portion will be very uniform, with a variance in wall thickness of the cylindrical portion being only about + or −10 percent.

The extruded sleeve from which the headed thermoplastic tube is formed is a sleeve cut from an extrusion which has a wall thickness in the molten state preferably two to three times the wall thickness of the final cooled extruded thickness. The extrusion from which the sleeve is cut can be of any shape. Consequently, the sleeve cut from the extrusion can take the shape of the extrusion like cylindrical, oval, elliptical, rectangular or any other shape. The shape of the sleeve used in the present invention is typically cylindrical. Such a tubular extrusion, as is known, is formed by extruding thermoplastic material from an extrusion annulus in a molten state and stretching the hot tubular form, in the direction of the longitudinal axis, into a tube or sleeve having a wall thickness one-half (½), one-third (⅓), or less, than the extrusion annulus. Such a stretch oriented extruded sleeve, when heated above the glass transition temperature of the thermoplastic material, due to the plastic memory of the thermoplastic material, will increase in thickness to the thickness of the molten material exiting the extrusion annulus, and shrink in length, thus providing sufficient molten plastic mass to form a head on the sleeve according to the present method. When using high density polyethylene (HDPE) or low density polyethylene (LDPE), for example, the annulus would extrude a tubular form of about 1.5 inch in diameter having a wall thickness between about 0.040–0.046 inch, which would be stretched into a stretch oriented extruded sleeve of about 1.0 inch in diameter having a wall thickness between about 0.015–0.018 inch.

An improvement over the process described in U.S. Pat. No. 5,069,856 is the present step of forming the headed end of the sleeve in a closure means instead of a molding die. Forming a headed end on the sleeve and capping the head with a closure means which may be reusable can be done in a single process step by the above improvement. Generally the closure means is designed to be reusable, i.e; to be secured back on the headed end of the sleeve once it is removed. A closure means may not be reusable, however, if it cannot be securely held onto the headed end once removed. All of the closure means of the present invention will be hereinafter referred to reusable closure means unless the closure means is specifically not reusable i.e., not designed for multiple uses. Forming a headed end in a reusable closure means assures a perfect fit between the headed end and the reusable closure and simplifies the manufacturing process.

The reusable closure means used in the method of the present invention functions as a mold for the neck or a mold for both the shoulder and neck when forming a head on the thermoplastic sleeve and a reusable cap for the finished thermoplastic tube. The reusable closure means is made of a material incompatible with the thermoplastic sleeve material such that when the molten end of the thermoplastic sleeve is pressed into the reusable closure means, the reusable closure means does not melt or stick to the molten preform.

Material incompatibility refers to incompatibility to the extent that a heated preform mass on the end of a thermoplastic sleeve will not soften or melt the interior surface of a reusable closure means causing the sleeve and the reusable closure means to adhere. Incompatibility need only extend to the surfaces of the thermoplastic sleeve and reusable closure means that contact each other, however incompatibility may be continuous throughout the materials used. Incompatibility, as defined above, may be achieved in numerous ways, the following serving as examples:

The reusable closure means may be made of a material other than a thermoplastic material such as wood, bamboo, glass or metal or any material that will not adhere to heated plastic.

Two thermoplastic materials having two different temperatures of melting are incompatible to the extent that they will not adhere to each other if the temperature of a first material is below the temperature of melting of a second material. For example, if the thermoplastic sleeve is polyethylene, then an appropriate incompatible thermoplastic material for the reusable closure means would be polypropylene.

A thermoplastic sleeve and reusable closure means would also be incompatible if the material temperatures were significantly different such that the thermoplastic sleeve cooled without adhering to the reusable closure means.

Two thermoplastic materials, with at least one treated to achieve incompatibility, will work in the method of the present invention. For example, a thermoplastic reusable closure means could be filled with an additive or treated with a coating to inhibit the adherence of a heated second thermoplastic material. Alternatively, a reusable closure means could be sprayed or treated with a mold release or slip agent to reduce adherence. A more specific example is using HDPE for both the thermoplastic sleeve and the reusable closure means, but adding mica fiber to the reusable closure means to increase its heat resistance. Mica fiber would not allow the molten preform to bond well to the reusable closure means.

The method of the present invention has several advantages. First, forming a head on the thermoplastic sleeve and capping the head with a closure means is performed in a single step. Secondly, forming a head in a closure means ensures a perfect fit. Thirdly, there is no die wear by forming a head in a reusable closure means. The reusable closure means serves as the die and it is replaced for every sleeve. Additionally, the method of the present invention is advantageous for forming an undercut on the head of the thermoplastic tube. An undercut is a groove, rib or niche created by a corresponding shape in a mold. If threads or undercuts are formed by the use of a die, then the die must be opened before the tube head is removed in order to provide clearance for the formed threads or grooves. However by forming the headed end of a thermoplastic tube in a reusable closure means, an open and close die need not be used in order to remove the capped tube. Additionally, unique features and shapes may be molded onto the thermoplastic tube depending on the shape of the mold, i.e., the reusable closure means.

Advantages may also be reaped by the simplicity of design of the reusable closure means. Simplicity of design makes molds less expensive and easier to operate. Simplicity of design also allows for the use of engineering plastics such as polyamide and polyacetol filled materials for the reusable closure means to optimize package performance for oxygen permeation. For example, a barrier tube can be used with a polyacetol reusable closure for superior performance related to the inhibiting of oxygen permeation.

Figure 1:
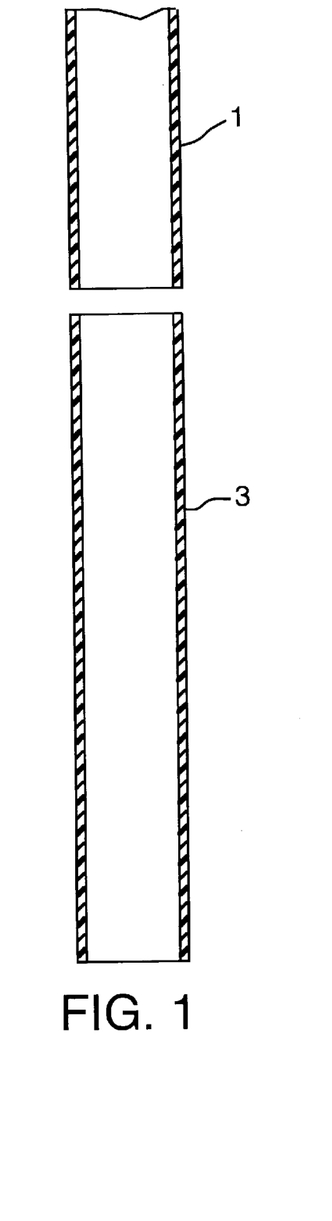
FIG. 1 illustrates, in cross-section, a thermoplastic extruded, stretched sleeve from which the method of the present invention forms a headed thermoplastic tube.
Figure 2:
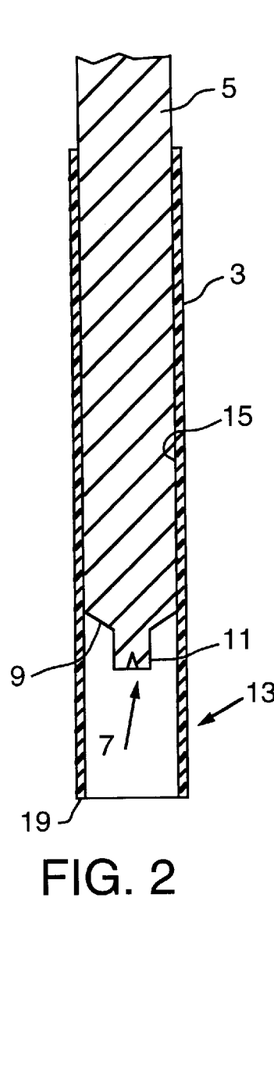
FIG. 2 illustrates the thermoplastic extruded, stretched, sleeve of FIG. 1 supported on a forming mandrel having a head forming end.

Referring now to the drawings, FIG. 1 shows a thermoplastic extruded, stretched extrusion 1 from which a thermoplastic extruded, stretched sleeve 3 is cut. In the preferred embodiment, the extrusion 1 is extruded and longitudinally stretched. The thermoplastic extruded, stretched sleeve 3 is disposed on a forming mandrel 5 that has a head forming end 7 formed of a shoulder 9 and a reduced diameter portion 11, with an exposed portion 13 of the thermoplastic extruded, stretched sleeve 3 extending beyond the head forming end 7 of the forming mandrel 5 (FIG. 2). The thermoplastic extruded, stretched sleeve 3 is frictionally held on the forming mandrel 5, with only a small clearance, such as about a 0.005 inch clearance, which maintains the sleeve in place, while preventing subsequent flow of hot fluid between the forming mandrel S and an inner wall surface is of the thermoplastic extruded, stretched sleeve 3.

With the thermoplastic extruded, stretched sleeve 3 disposed on forming mandrel 5, the inner wall surface 15 of the exposed portion 13 is heated by use of a heat source inserted into an open end 19 of the exposed portion 13 of sleeve 3. It can be heated by impingement thereon of a hot fluid, such as air illustrated by the arrows in FIG. 3, from a hot air nozzle 17 which is sized so as to permit insertion thereof into the open end 19 of the exposed portion 13. The hot air is directed outwardly towards the inner wall surface 15 and flows away from the head forming end 7 of the unheated forming mandrel 5.

The hot air nozzle 17 and forming mandrel 5 are reciprocally associated so that the hot air nozzle 17 can be disposed in and removed from the exposed portion 13 of thermoplastic extruded, stretched sleeve 3. Hot air nozzle 17 is shown as reciprocally movable, indicated by the dashed arrow in FIG. 3, while alternately the same can be fixed and the forming mandrel 5 can be reciprocally movable.

The hot fluid heats the inner wall surface 15 of the exposed portion 13 to a temperature above the glass transition temperature of the thermoplastic material and melts the inner wall surface 15, while an outer surface 21 of the exposed portion 13 provides sufficient support to maintain the exposed portion 13 as a substantially cylindrical shape. When sufficient heat has been applied to the inner wall surface 15 of the exposed portion 13 to melt the same, the hot air nozzle 17 is removed from the exposed portion 13 and the heated exposed portion 13 is shaped into a conical or fluted cone shape 25, such as by the application of additional heat of further hot fluid, indicated by arrows in FIG. 4.

Figure 4:
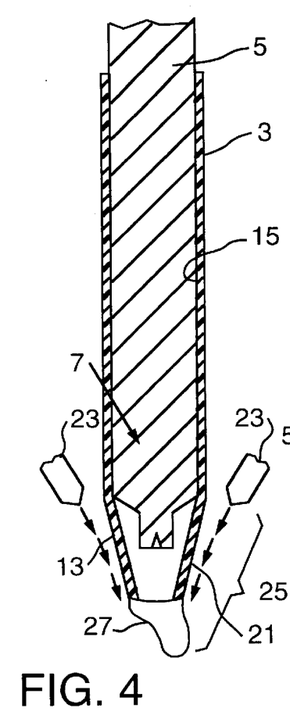
FIG. 4 illustrates the shaping of the heated exposed portion of the thermoplastic extruded sleeve into a conical shape.

Hot air from external hot air nozzles 23, heats the outer surface 21 of the exposed portion 13 of the thermoplastic extruded, stretched sleeve 3 to a temperature above the glass transition temperature of the thermoplastic material and melts the same and renders it in a moldable state. While the heating of the outer surface 21 by a hot fluid may be used to form the conical shape 25, it is also possible to continue the heating of the inner wall surface 15 of the exposed portion 13 until the outer surface 21 no longer maintains the substantially cylindrical shape, such that a conical shape results in the exposed portion 13. Because the thermoplastic extruded sleeve 3 is a stretched material, when the exposed portion 13 is heated above the glass transition temperature, the plastic memory responds and the exposed portion 13 swells to a thickness of or substantially the thickness of the tubular extrusion thickness, generally about two to three times the wall thickness of the thermoplastic extruded, stretched sleeve 3. The hot exposed portion 13, when above the glass transition temperature, in addition to swelling in wall thickness, shrinks in the direction of the axis of the sleeve 3 and provides a mass of moldable thermoplastic material 27 for the forming of a head.

Figure 5:
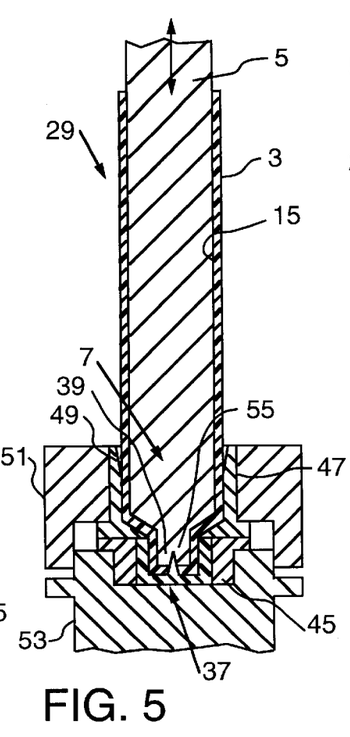
FIG. 5 illustrates pressure being applied to the conical shaped exposed portion of the thermoplastic extruded sleeve and contact with a reusable closure means of a first embodiment to form a head.
Figure 6:
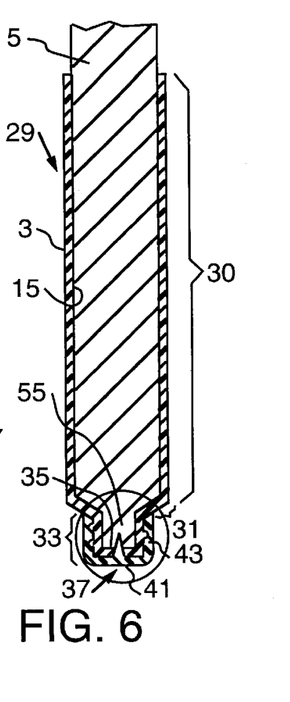
FIG. 6 illustrates a finished headed thermoplastic tube having a reusable closure means of the first embodiment on the forming mandrel prior to release therefrom.

After shaping of the heated exposed portion 13 of the thermoplastic extruded, stretched sleeve 3 into the conical shape 25, pressure is applied through the head of forming end 7 of the forming mandrel 5 to form a headed thermoplastic tube 29 which comprises a body portion 30, a shoulder portion 31 and a neck portion 33 having a closed end 35 to close the end of the sleeve 3, as shown clearly in FIG. 6. The forming of a head on thermoplastic tube 29 is carried out by applying pressure to the conical shaped portion 25 which includes the mass of moldable thermoplastic material 27. Sufficient force or pressure may be applied by use of the head forming end 7 of the forming mandrel 5 and a reusable closure means 37 of a first embodiment. Reusable closure means 37 of a first embodiment has an internal cavity 39 formed by a bottom wall 41 and a side wall 43, as illustrated clearly in FIG. 6, and held in place by die member 45, shown in FIG. 5.

Die member 45 has an internal cavity the size of the exterior surface of the reusable closure means 37 of the first embodiment in order to firmly hold the reusable closure means 37 of the first embodiment during the forming of a head on the thermoplastic sleeve 3. Positioned on top of die member 45, so that an internal cavity is aligned with the internal cavity of die member 45, is shoulder forming member 47. Shoulder forming member 47 is shaped to form the shoulder portion 31 of the headed thermoplastic tube 29. Shoulder forming member 47 may have an angled portion 49 which acts to guide the insertion of thermoplastic sleeve 3 into shoulder forming member 47 and die member 45. Both shoulder forming member 47 and die member 45 are held in place by upper holding support 51 and lower holding support 53.

The forming mandrel 5 is illustrated by an arrow in FIG. 5 as being able to insert into shoulder forming member 47 and reusable closure means 37 of the first embodiment to form the conical shaped portion 25 of thermoplastic sleeve 3 into a head having shoulder portion 31 and neck portion 33. Alternatively, forming mandrel S could be fixed and shoulder forming member 47 and reusable closure means 37 of the first embodiment could be moved to cause the application of pressure and the formation of headed thermoplastic tube 29.

Preferably, reusable closure means 37 of the first embodiment has an orifice-forming spike 55 located in the center of internal cavity 39. Orifice-forming spike 55 is a protrusion which prohibits the complete closure, except for a small orifice, of closed end 35 when conical shaped portion 25 is being shaped in the molding process.

Figure 10:
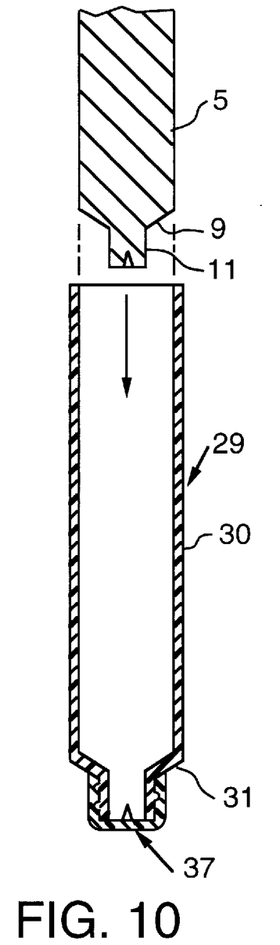
FIG. 10 illustrates the finished headed thermoplastic tube having a reusable closure means of the first embodiment released from the forming mandrel.

FIG. 6 illustrates the formed headed thermoplastic tube 29 having reusable closure means 37 of the first embodiment after removal from die member 45 and still retained on the forming mandrel 5. FIG. 10 shows the stripping or unloading of the finished headed thermoplastic tube 29 having reusable closure means 37 of the first embodiment removed from forming mandrel S for finishing or use.

Figure 7:
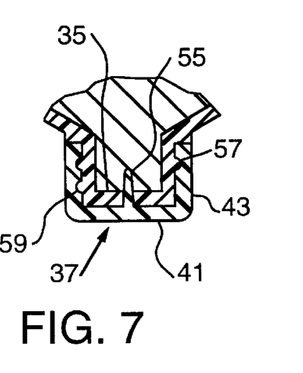
FIG. 7 is an enlargement of the circled portion of FIG. 6 showing a threaded fit of the reusable closure means of the first embodiment with the thermoplastic tube.

FIG. 7 is an enlargement of the circled portion of thermoplastic tube 29 of FIG. 6. FIG. 7 shows a threaded fit of the reusable closure means 37 of the first embodiment created by a continuous concave groove 57 having a "screw" or spiral path in the interior surface of the reusable closure means 37 of the first embodiment. Inside groove 57 is formed a reciprocating continuous rib 59 during the formation of neck portion 33 of thermoplastic tube 29. The cooperation of groove 57 and rib 59 creates a "threaded" fit so that the reusable closure means 37 of the first embodiment may be screwed back on neck portion 33 once removed. Alternatively, groove 57 may have the shape of a non-continuous spiraling groove.

Figure 8:
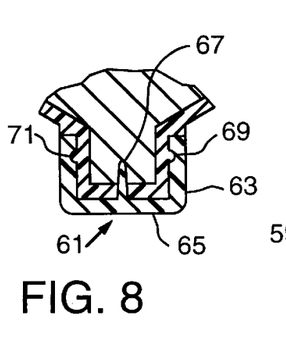
FIG. 8 illustrates, in cross-section, a headed portion of a thermoplastic tube with a reusable closure means of a second embodiment having a snap fit with the thermoplastic tube.

FIG. 8 illustrates, in cross-section, a headed portion of thermoplastic tube 29 with a reusable closure means 61 of a second embodiment. Reusable closure means 6i of the second embodiment has a side wall 63, a bottom wall 65 with an orifice-forming spike 67 and a circular groove 69. Circular groove 69 is a groove in the shape of a circle around the inner surface of side wall 63 at a location away from bottom wall 65. Inside circular groove 69 is formed a reciprocating circular rib 71 during the formation of neck portion 33 of thermoplastic tube 29. The cooperation of circular groove 69 and circular rib 71 creates a "snap" fit so that the reusable closure means 61 of the second embodiment may be snapped back on neck portion 33 once removed. Circular groove 67 may be positioned anywhere on side wall 63, preferably in a location that provides a secure snap fit. Alternatively, groove 69 may have the shape of a non-continuous circular groove or a series of semi-circular indents.

Figure 9:
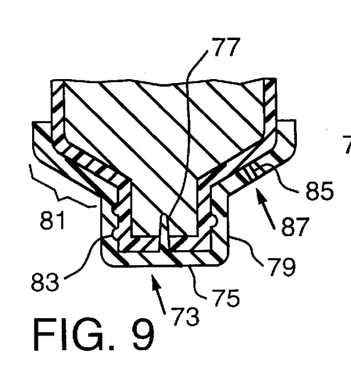
FIG. 9 illustrates, in cross-section, a headed portion of a thermoplastic tube with a reusable closure means of a third embodiment having a threaded fit and a tamper evident feature, still on a forming mandrel prior to release therefrom.

FIG. 9 illustrates, in cross-section, a headed portion of thermoplastic tube 29 with a reusable closure means 73 of a third embodiment. Reusable closure means 73 of the third embodiment has a bottom wall 75 with an orifice-forming spike 77, a side wall 79, and a shoulder forming wall 81. Reusable closure means 73 of the third embodiment also has a groove 83 on the inner surface of side wall 79 which functions the same groove S7 in reusable closure means 37 of the first embodiment. Alternatively, groove 83 may have the shape of a non-continuous spiraling groove.

Shoulder forming wall 81 has at least one orifice 85 which may have any shape but is preferably a round hole. During the formation of a head on thermoplastic tube 29, thermoplastic material from heated conical shaped portion 25 enters and fills orifice 85 so that the thermoplastic material is visible from observing the exterior surface of reusable closure means 73 of the third embodiment. The thermoplastic material that fills orifice 85 is referred to as a "button" 87.

Button 87 helps to secure reusable closure means 73 of the third embodiment onto the head of thermoplastic tube 29. This securing function is advantageous during shipping. Button 87 may be broken by the application of force to the reusable closure means 73 of the third embodiment when it is first removed. Once severed from the head formed on thermoplastic tube 29, button 87 will not be supported from its underside and may fall out of orifice 85. The presence or absence of button 87 serves as a tamper evident indicator showing whether thermoplastic tube 29 has been previously opened. This information may be used by the end user as an indication of product integrity.

The thermoplastic headed tubes formed by the present method are tubes which have no seams or joints between the various portions. Referring back to FIG. 6, the thermoplastic headed tube 29 has body portion 30, shoulder portion 31 and neck portion 33, all of which are comprised of the thermoplastic material that the thermoplastic extruded, stretched sleeve 3 was formed, and there are no seams or joints present throughout the entire tube.

Figure 11:
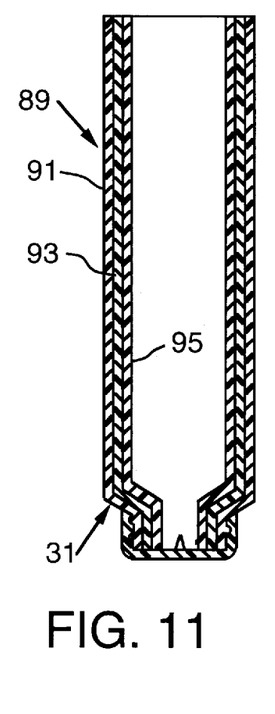
FIG. 11 illustrates, in cross-section, a finished headed thermoplastic tube having a reusable threaded closure means of the first embodiment formed by the present method from a multi-layer thermoplastic extruded, stretched sleeve having three layers.

The thermoplastic headed tube, as hereinbefore described, may be formed from a single thermoplastic material or a laminate comprised of multi-layers of thermoplastic materials, at least one of which may be an oxygen-impermeable material. FIG. 11 for example, illustrates a multi-layer thermoplastic headed tube 89 as would be produced according to the present method, having three layers, an outer layer 91, an intermediate layer 93 and an inner layer 95, where the outer and inner layers 91 and 95 are formed of a different thermoplastic material than the intermediate layer 93. For example, the outer and inner layers 91 and 93 can comprise polyethylene while the intermediate layer 93 would by an oxygen-impermeable layer, such as a polyamide such as nylon, or ethylene polyvinyl alcohol, a polyvinylidene chloride, or the like. Tube 89 is illustrated as having the reusable closure means 37 of the first embodiment.

Figure 12:
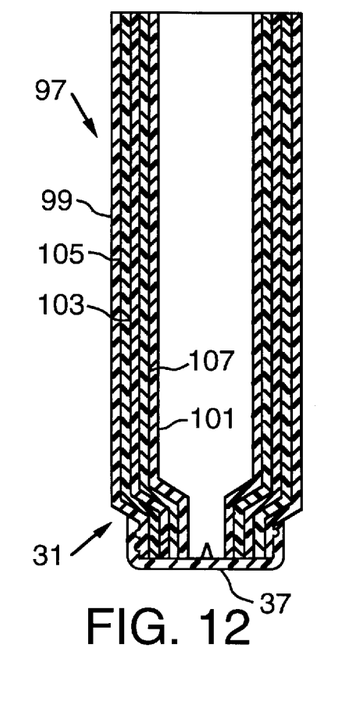
FIG. 12 illustrates, in cross-section, a finished headed thermoplastic tube having a reusable threaded closure means of the first embodiment formed by the present method from a multi-layer thermoplastic extruded, stretched sleeve having five layers.

FIG. 12 illustrates a multi-layer thermoplastic headed tube 97 as would be prepared using the present method, having five layers, an outer layer 99, an inner layer 101, an intermediate impermeable layer 103, and two adhesive layers 105 and 107, one of the layers of adhesive provided between the intermediate layer 103 and each of the outer and inner layers 99 and 101. Such a tube could, for example, use polyethylene, polypropylene, or a polyester such as polyethylene terephthalate as the outer and inner layers 99 and 101, an oxygen-impermeable material such as nylon, ethylene polyvinyl alcohol, polyvinylidene chloride, as the intermediate layer 103, and adhesive layers 105 and 107 to bond the outer and inner layers 99 and 101 to the intermediate layer 103. Tube 99 is illustrated as having the reusable closure means 37 of the first embodiment. Table I shows additional examples of a five layer tube made by the method of the present invention.

Barrier tubes, like oxygen barrier tubes, formed by the method of the present invention are superior to regular barrier tubes because the barrier material is continuous throughout the tube up to the orifice. The orifice is the only break in the barrier material making the barrier tube made by the present method superior to barrier tubes with welded and jointed parts. Other barrier tubes do not have a continuous, uninterrupted barrier layer.

Figures 13, 14, 15:
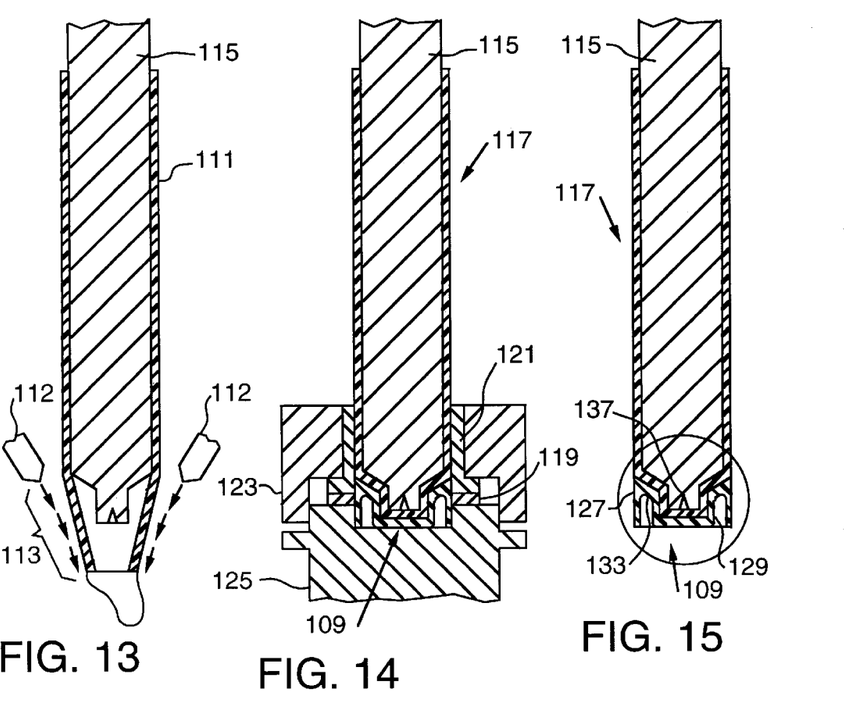
FIG. 13 illustrates, in cross-section, the shaping of the heated exposed portion of the thermoplastic extruded sleeve on a forming mandrel designed to have a cooperating shape for a reusable closure means of a fourth embodiment.
FIG. 14 illustrates pressure being applied to the conical shaped exposed portion of the thermoplastic extruded sleeve and contact with a reusable closure means of the fourth embodiment to form a head.
FIG. 15 illustrates a finished headed thermoplastic tube having a reusable closure means of the fourth embodiment on the forming mandrel prior to release therefrom.

FIGS. 13–16 illustrate, in cross-section, the same process series as FIGS. 4–7 except a reusable closure means 109 of a fourth embodiment is used to form a head on a thermoplastic sleeve 111. Heat is applied by source 112 to an exposed portion 113 of thermoplastic sleeve 111 positioned on a forming mandrel 115 designed to have one end with a cooperating shape for reusable closure means 109 of the fourth embodiment as depicted in FIG. 14.

Sufficient pressure is applied to heated exposed portion 113 so that a thermoplastic tube 117 with a headed end is formed in reusable closure means 109 of the fourth embodiment held in place by the assembly comprising members 119, 121, 123 and 125 of FIG. 14, which are similar in function to the corresponding members 45, 47, 51 and 53 respectively of FIG. 5.

Figure 16:
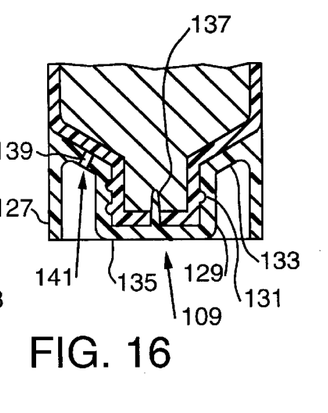
FIG. 16 is an enlargement of the circled portion of FIG. 15 showing a threaded fit of the reusable closure means of the fourth embodiment with the thermoplastic tube and a tamper evident feature and securing means on the reusable closure means of the fourth embodiment.

Reusable closure means 109 of the fourth embodiment, illustrated in FIG. 15 and enlargement FIG. 16 has an outer side wall 127, an inner side wall 129 with a continuous groove 131 on the inside surface, a shoulder forming wall 133 and a bottom wall 135 with an orifice-forming spike 137. Reusable closure means 109 of the fourth embodiment also has at least one orifice 139 for the formation of at least one securing and tamper evident button 141 in shoulder forming wall 133 or bottom wall 135. Tamper evident button 141 has the same function as that described for the reusable closure means 73 of the third embodiment. The outside surface of outside wall 127 of reusable closure means 109 of the fourth embodiment is designed to be flush with the outside surface of thermoplastic tube 117.

Figures 17, 18:
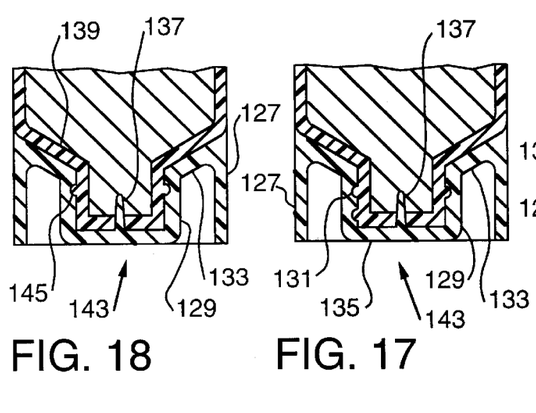
FIG. 17 illustrates, in cross-section, a headed portion of a thermoplastic tube with a reusable closure means of a fifth embodiment having a threaded fit with a thermoplastic tube and no tamper evident feature.
FIG. 18 illustrates, in cross-section, a headed portion of a thermoplastic tube with a reusable threaded closure means of a sixth embodiment having a snap fit and tamper evident feature, still on a forming mandrel prior to being released therefrom.

A reusable closure means 143 of a fifth embodiment, as in FIG. 17, is the same as reusable closure means 109 of the fourth embodiment except shoulder forming wall 133 is solid, having no orifice for the formation of a protruding thermoplastic button. FIG. 18 shows a reusable closure means of a sixth embodiment which is the same as reusable closure means 109 of the fourth embodiment with the substitution of a snap fit groove 145, like groove 69 in the reusable closure means 61 of the second embodiment, instead of a thread fit groove 131, like in the reusable closure means 109 of the fourth embodiment.

Figures 19, 20:
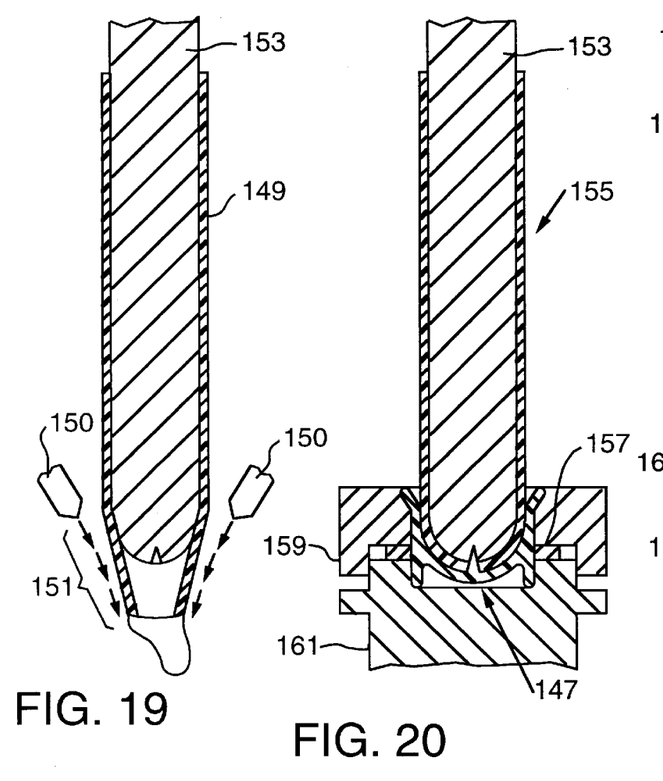
FIG. 19 illustrates, in cross-section, the shaping of the heated exposed portion of the thermoplastic extruded sleeve on a forming mandrel designed to have a cooperating shape for a closure means of a seventh embodiment.
FIG. 20 illustrates pressure being applied to the conical shaped exposed portion of the thermoplastic extruded sleeve and contact with a closure means of the seventh embodiment to form a head.
Figure 21:
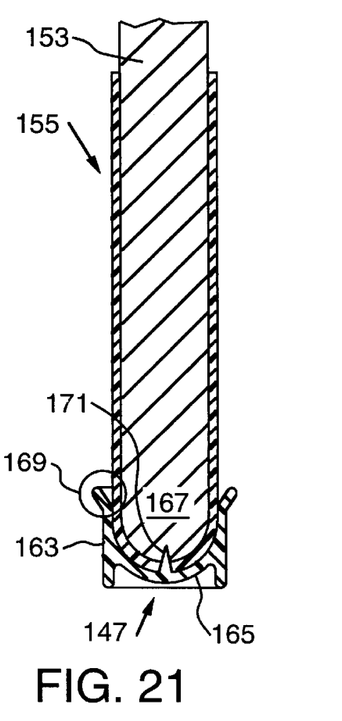
FIG. 21 illustrates a finished headed thermoplastic tube having a closure means of the seventh embodiment on the forming mandrel prior to release therefrom.

FIGS. 19–21 illustrate, in cross-section, the same process series as FIGS. 4–7 except a closure means 147 of a seventh embodiment is used to form a head on a thermoplastic sleeve 149. Heat is applied from source 150 to an exposed portion 151 of thermoplastic sleeve 149 positioned on a forming mandrel 153 which has one end made to cooperate with the closure means 147 of the seventh embodiment as depicted in FIG. 20.

Sufficient pressure is applied to heated exposed portion 151 so that a thermoplastic tube 155 with a headed end is formed in closure means 147 of the seventh embodiment held in place by the assembly comprising members 157, 159 and 161 of FIG. 20, which are similar in function to the corresponding members 45, 51 and 53 respectively of FIG. 5.

Figure 22:
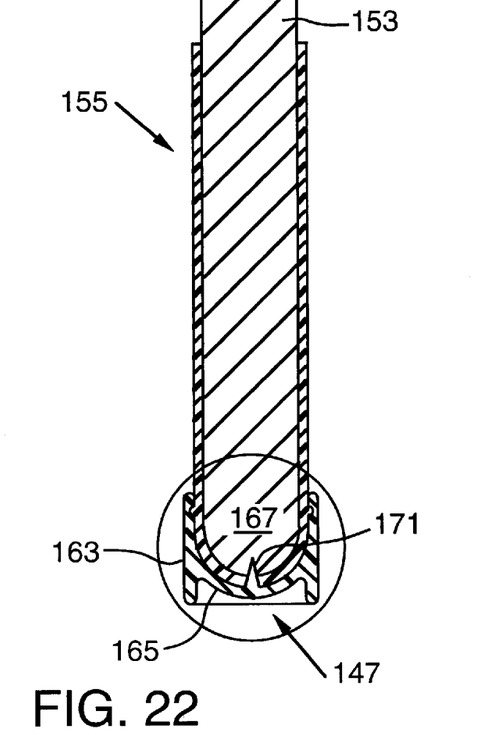
FIG. 22 illustrates a finished headed thermoplastic tube having a closure means of the seventh embodiment on the forming mandrel prior to release therefrom without an angled portion.

Closure means 147 of the seventh embodiment, illustrated in FIG. 21, has an outer side wall 163 and a dome-shaped bottom wall 165, which together forms a semi-spherical interior cavity 167. Outer side wall 163 may have an angled portion 169 to act as a guide for the insertion of thermoplastic sleeve 149. Closure means 147 of the seventh embodiment is shown in FIG. 22 without angled portion 169. Closure means 147 of the seventh embodiment also has an orifice-forming spike 171 located in the center of internal cavity 167. Since closure means 147 of the seventh embodiment does not have a threaded or snap fit to thermoplastic tube 155, it is only reusable to the extent that it may be placed back on the headed end of thermoplastic tube 155 to close the orifice in the center of the headed end, however it is not securely held on the headed end. Closure means 147 of the seventh embodiment is better suited for a one time use.

Figure 23:
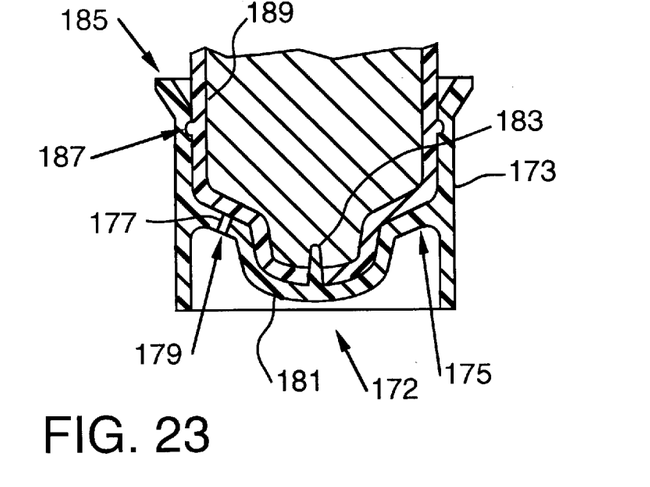
FIG. 23 illustrates, in cross-section, a headed portion of a thermoplastic tube with reusable closure means of an eighth embodiment having a snap fit, still on forming mandrel prior to being released therefrom.

FIG. 23 illustrates a reusable closure means of an eighth embodiment 172 having a an outer side wall 173, a shoulder forming wall 175 with at least one orifice 177 for forming at least one tamper evident button 179 and a narrow dome-shaped bottom wall 181 capable of forming a headed thermoplastic tube having a tip of narrower diameter. Narrow dome-shaped bottom wall 181 has an orifice-forming spike 183. Outer side wall 173 may have an angled portion 185 to act as a guide for the insertion of thermoplastic sleeve 149. Outer side wall 173 may also have a circular groove 187 for the creation of cooperating rib 189 to create a snap fit between reusable closure means 172 of the eighth embodiment and thermoplastic tube 155. Alternatively, groove 187 may be in the shape of a continuous or non-continuous spiral.

It is also possible to use a "flip top" closure as the closure means for forming a headed end on a thermoplastic sleeve. A "flip top" closure refers to a complete closure having a resealable closure means connected to, by a strap, hinge or other connecting means, the remainder of the closure which has an orifice and which is connected to a thermoplastic tube. Three embodiments of a flip top closure means are illustrated in FIGS. 24–26.

Figure 24:
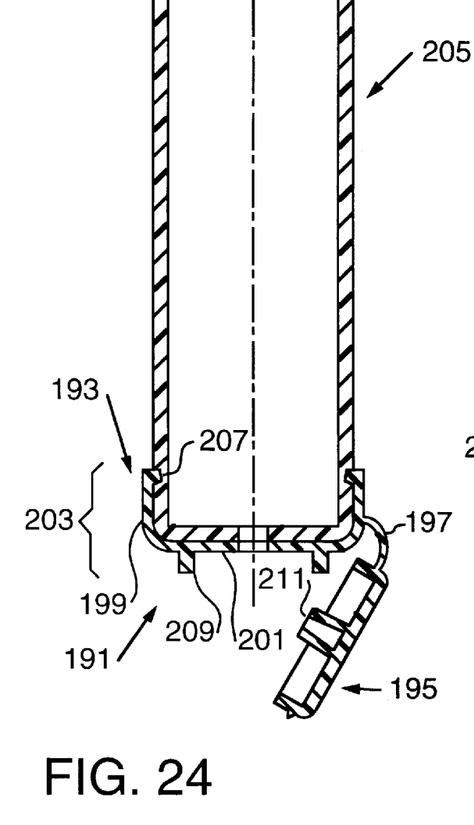
FIG. 24 illustrates, in cross-section, a headed portion of a thermoplastic tube with a flip top closure means of a first embodiment.

FIG. 24 illustrates a flip top closure 191 of a first embodiment in an open position having an orifice section 193 and a resealable lid 195 attached to the orifice section 193 by strap 197. Orifice section 193 has a side wall 199 and bottom wall 201 for forming a corresponding head 203 on a thermoplastic sleeve to form thermoplastic tube 205. Orifice section 193 has member 207 which secures orifice section 193 to thermoplastic tube 205 and member 209 which secures resealable lid 195 to orifice section 193. Resealable lid 195 has an orifice forming member 211. Resealable lid 195 may be opened and closed and at the same time connected to orifice section 193 by strap 197.

Figure 25:
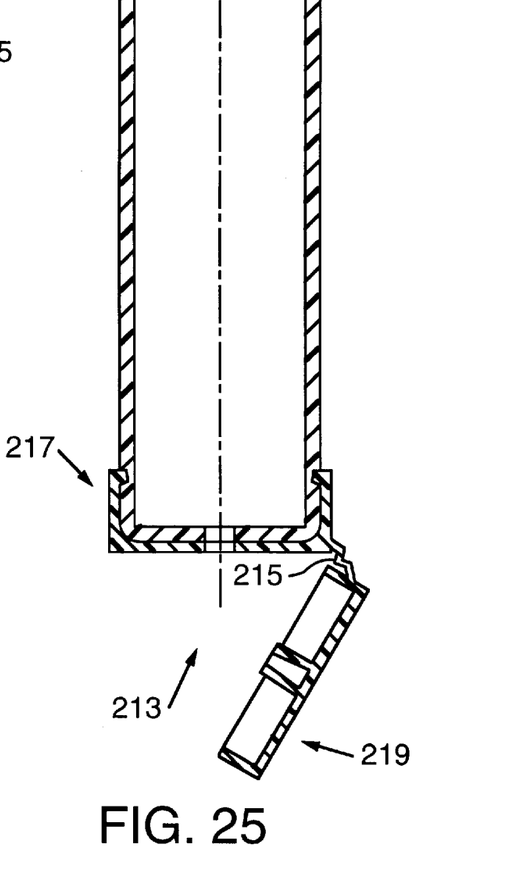
FIG. 25 illustrates, in cross-section, a headed portion of a thermoplastic tube with a flip top closure means of a second embodiment.

FIG. 25 illustrates a flip top closure 213 of a second embodiment in an open position similar to flip top closure 191 of the first embodiment except a hinge 215 connects orifice section 217 to resealable lid 219 in stead of a strap.

Figure 26:
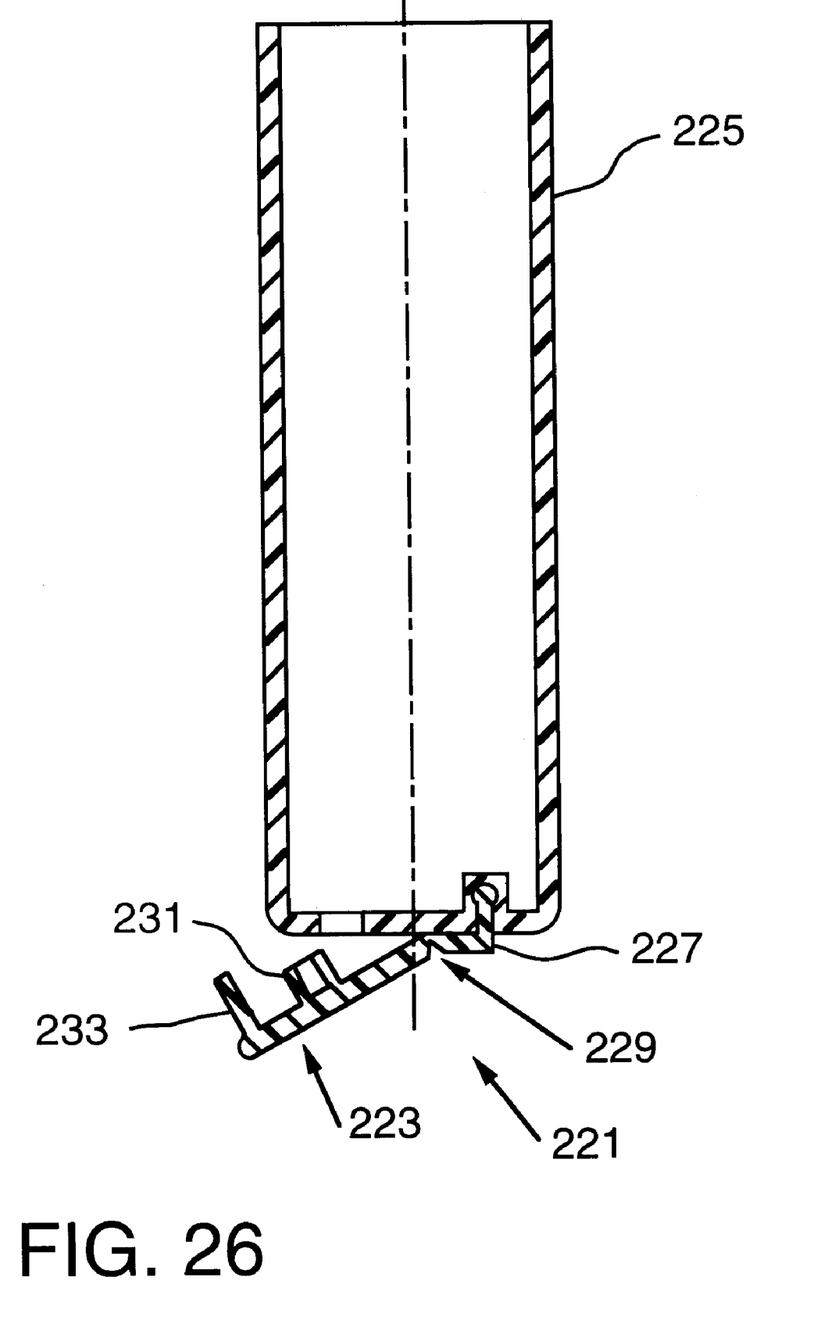
FIG. 26 illustrates, in cross-section, a headed portion of a thermoplastic tube with a flip top closure means of a third embodiment.

FIG. 26 illustrates a flip top closure 221 of a third embodiment composed of a single member having a resealable portion 223 and an base portion 227 which is anchored in thermoplastic tube 225. A notch 229 along the length of the flip top closure 221 of the third embodiment allows resealable portion 223 to be movable separately from the fixed base portion 227. Resealable portion 223 has a has an orifice forming member 231 and a securing member 233 for securing the resealable portion 223 to base portion 227. The advantage of the flip top closure 221 of a third embodiment is that it is one piece, cost efficient, contains an orifice forming member and forms a perfect fit with a thermoplastic tube made by the method of the present invention.

Manufacturing thermoplastic tubes with flip top closures by the method of the present invention, creates an additional manufacturing efficiency, besides forming a headed thermoplastic tube with a resealable closure in a single step. A flip top closure is different than the typically round reusable closure means, in that a flip top closure has a front, where an orifice is located, and a back where a hinge or connecting means is located. The front of a tube with a flip top closure is the portion closest to the orifice in the closure. The additional efficiency created is that manufacturing by the method of the present invention automatically gives every tube a front side and a back side and because every tube is manufactured in the same orientation, the orientation may be used for decorating specifically on the front or back sides.

The prior art manufacturing method of providing a flip top closure means for a headed tube after the head was formed did not also automatically orient the tubes in a uniform direction, thus the tubes would have to be adjusted if a particular front or back side printing was desired. By manufacturing with the method of the present invention an additional step of tube orientation, necessary for printing a graphic on the front of the tube or the back side of the tube, is eliminated.

Figure 27:
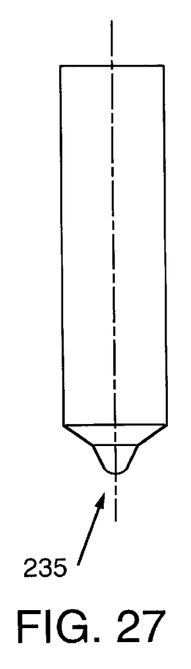
FIG. 27 illustrates, in cross-section, a first shape of a headed thermoplastic tube.
Figure 28:
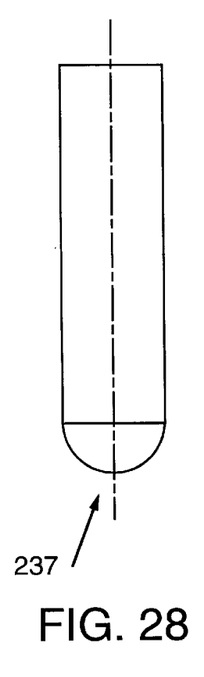
FIG. 28 illustrates, in cross-section, a second shape of a headed thermoplastic tube.
Figure 29:
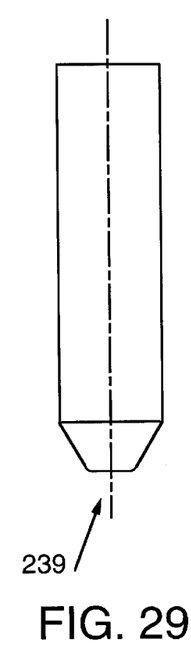
FIG. 29 illustrates, in cross-section, a third shape of a headed thermoplastic tube.
Figure 30:
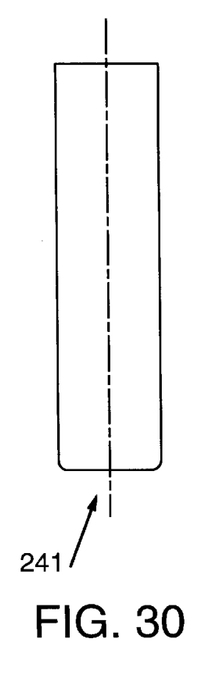
FIG. 30 illustrates, in cross-section, a fourth shape of a headed thermoplastic tube.

FIGS. 27–30 illustrate cross-sectional shapes for thermoplastic tubes made according to the method of the present invention. A reusable closure means having an similar but inverted shape would be used to form the heads of the thermoplastic tubes having the shapes as shown in FIGS. 24–27. FIG. 27 is a shape 235 for a thermoplastic tube having a directional tip of narrower diameter. FIG. 28 is a dome-shape 237 for a headed thermoplastic tube and FIG. 29 is a cone-shape 239 for a headed thermoplastic tube. FIG. 30 is a squared-shape 241 for a headed thermoplastic tube.

Figure 31:
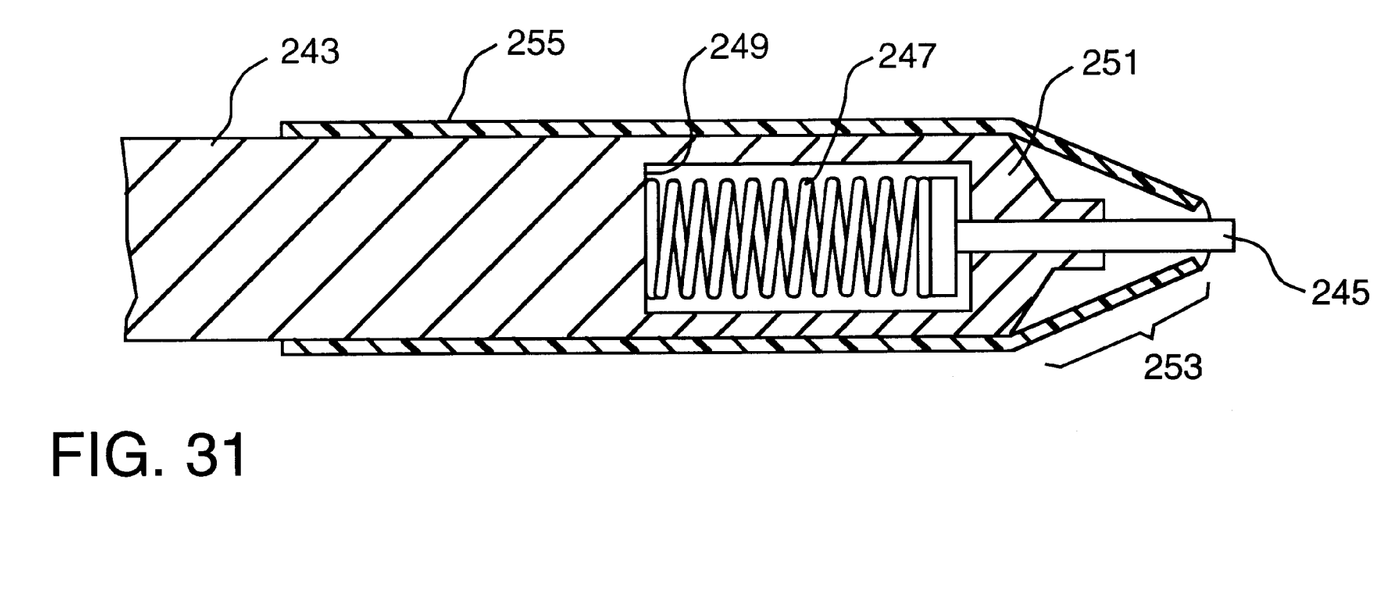
FIG. 31 illustrates a thermoplastic sleeve on a forming mandrel, the mandrel having an orifice forming pin.

FIG. 31 illustrates an alternate method for forming an orifice in a thermoplastic tube during the manufacturing process. Forming mandrel 243 having a spring loaded pin 24S housed in the body of forming mandrel 243 may be used in the same process steps as illustrated in FIGS. 2–7. Spring loaded pin 245 is slidably mounted inside forming mandrel 243 such that one end of spring loaded pin 245 is free and the other end contacts a spring 247 which can be expanded and compressed. Spring 247 contacts spring loaded pin 245 at one end and a support surface 249 at an opposite end.

Figure 3:
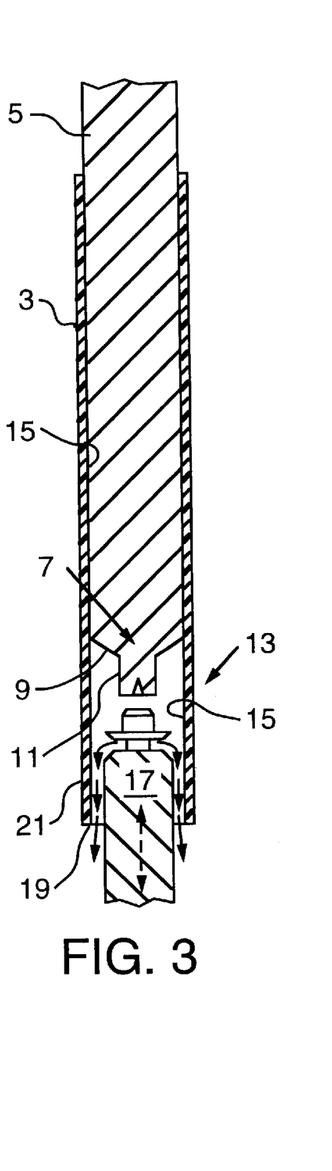
FIG. 3 illustrates heating of the exposed inner wall surface of the exposed portion of the thermoplastic extruded, stretched sleeve by a hot fluid.

During the steps illustrated in FIGS. 2, 3 and 6, spring loaded pin 24S extends beyond head forming end 251 of forming mandrel 243, as illustrated in FIG. 13, to provide a structure around which thermoplastic material 253 of thermoplastic sleeve 255 forms. When forming mandrel 243 is inserted into a reusable closure, like reusable closure 37 of FIG. 5 for forming a headed end on thermoplastic sleeve 255, spring loaded pin 245 is compressed into forming mandrel 243 leaving only a small portion of spring loaded pin 245 extended to contact the reusable closure. Spring 247 has low tension so as not to force thermoplastic sleeve 255 off forming mandrel 243 when removed from the gripping means holding the reusable closure. When the thermoplastic sleeve is removed, spring loaded pin 245 expands again.

The present method provides for the formation of a headed thermoplastic tube having a reusable closure means from an extruded plastic sleeve without the need for welding or fusing together of any separate components. The headed end of the thermoplastic tube may be formed and capped with a reusable closure means in one step. The resultant headed tube has no seams, welds or joints. With thermoplastic laminates containing a barrier layer, the absence of such seams or joints is especially useful since there is a continuous barrier layer throughout the body portion, shoulder portion and neck portion. Complete control of the thickness and weight of the head portion of the tube can be achieved.

Also, the color of the head portion and body portion will be exactly the same, and the decorative features of the body portion, such as stripes or windows can be carried through and incorporated in the head portion of the resultant tube.

While there has been illustrated and described several embodiments of the present invention, it will be apparent that various changes and modifications thereof will occur to those skilled in the art. It is intended in the appended claims to cover all such changes and modifications that fall within the true spirit and scope of the present invention.

What is claimed is:

1. In a method of forming a headed thermoplastic tube having a closure on its head from a longitudinally stretched, extruded thermoplastic sleeve having a continuous wall with inner and outer wall surfaces by:

positioning a longitudinally stretched, extruded thermoplastic sleeve over a forming mandrel having a head forming end, with an exposed portion of said longitudinally stretched, extruded thermoplastic sleeve having an open end extending beyond said head forming end;

heating he inner wall surface of said exposed portion of said longitudinally, stretched extruded thermoplastic sleeve by a heat source so that the heated exposed portion shrinks and thickens; and pressing the heated exposed portion into a mold cavity to form a head on said longitudinally stretched, thermoplastic sleeve;

the improvement which comprises:

pressing he heated exposed portion with sufficient force into a closure having an interior cavity formed by at least a bottom wall and a side wall comprised of a material that is incompatible with the material from which said longitudinally stretched, extruded thermoplastic sleeve is comprised so as to form from said heated exposed portion a head on said thermoplastic sleeve to conform to the interior cavity of said closure and to form an orifice in said head during forming of said head with use of an orifice-forming spike on said closure; wherein the closure used during forming of said head functions as said mold cavity and also functions as the closure for the headed thermoplastic tube having a closure on its head such that the headed thermoplastic tube having a closure on its head is formed in a single pressing step.

2. The method of forming a headed thermoplastic tube as defined in claim 1, wherein said closure is made reusable by having a groove on said side wall thereof within said interior cavity selected from the group consisting of a continuous spiraling groove, non-continuous spiraling groove, a single continuous circular groove, and a single non-continuous circular groove, so that a cooperating rib member is formed on said head during formation thereof.

3. The method of forming a headed thermoplastic tube as defined in claim 1, wherein said closure is a single member with a resealable portion and a base portion, said single member having a notch along the length of the single member which allows said resealable portion to be movable separately from said base portion.

4. The method of forming a headed thermoplastic tube as defined in claim 1, wherein said thermoplastic sleeve is a single layer made from a material selected from the group consisting of LDPE, HDPE, PP and PET and said closure is made of a single incompatible material selected from the group consisting of LDPE, HDPE PP, PET, polyamide and polyacetol.

5. The method of forming a headed thermoplastic tube as defined in claim 1, wherein said thermoplastic sleeve is a multiple layer sleeve made from at least two materials selected from the group consisting of LDPE, HDPE, PP, EVOH, an adhesive material and an oxygen barrier material and said closure is made of a single incompatible material selected from the group consisting of LDPE, HDPE, PP, PET, polyamide and polyacetol.

6. A method of forming a headed thermoplastic tube as defined in claim 1, wherein said thermoplastic tubes produced with a closure have a headed end in a shape selected from the group consisting of a dome shape, a cone shape, a square shape and a directional tip shape.

7. A method of forming a headed thermoplastic tube as defined in claim 1, wherein said thermoplastic tubes produced have a wall thickness of between 0.010 and 0.020 inch and a head thickness of between 0.030 and 0.050 inch.

8. The method of forming a headed thermoplastic tube as defined in claim 1, wherein said closure has an interior cavity formed by a bottom wall, a side wall having a neck forming portion and a shoulder forming wall, such that both a shoulder and neck are formed on said heated exposed portion of said thermoplastic sleeve to conform to the interior cavity of said closure.

9. The method of forming a headed thermoplastic tube as defined in claim 8, wherein said shoulder forming wall of said closure has at least one orifice for forming a tamper evident button on said shoulder of said thermoplastic tube during forming of said head.

10. The method of forming a headed thermoplastic tube as defined in claim 1, wherein said closure has an interior cavity formed by a dome-shaped bottom wall and a side wall, such that a semi-spherical head is formed to conform to the interior cavity of said closure.

11. The method of forming a headed thermoplastic tube as defined in claim 10, wherein said dome-shaped bottom wall of said closure has at least one orifice for forming a tamper evident button on said thermoplastic tube during forming of said head.

12. The method of forming a headed thermoplastic tube as defined in claim 1, wherein said thermoplastic sleeve is a single layer made from a PE blend selected from the group consisting of 80%LD/20%HD; 60%LD/40%HD; 40%LD/60%HD; 20%LD/80%HD and said closure is made of a single incompatible material selected from the group consisting of HDPE, PP, PET, polyamide and polyacetol.

13. The method of forming a headed thermoplastic tube as defined in claim 12, wherein said PE blend is made from post-consumer grind.

14. The method of forming a headed thermoplastic tube as defined in claim 1, wherein said material comprising said closure and said material comprising said thermoplastic sleeve are incompatible such that a heated preform mass on the exposed portion of said thermoplastic sleeve will not soften or melt said interior cavity of said closure causing said sleeve and said closure to adhere.

15. The method of forming a headed thermoplastic tube as defined in claim 14, wherein said material comprising said closure and said material comprising said thermoplastic sleeve have different melting temperatures.

16. The method of forming a headed thermoplastic tube as defined in claim 14, wherein said material comprising said closure is not a thermoplastic material.

17. The method of forming a headed thermoplastic tube as defined in claim 14, wherein at least one of said material comprising said closure and said material comprising said thermoplastic sleeve is treated with a member selected from the group consisting of an additive and a coating which inhibits the adherence of a heated second thermoplastic material.

18. The method of forming a headed thermoplastic tube as defined in claim 1, wherein said closure has an interior cavity formed by an orifice section with a bottom wall, a side wall and an orifice and said closure has a resealable lid connected to said orifice section by a connecting means, whereby a head is formed on said thermoplastic sleeve by the insertion of said heated exposed portion into said orifice section.

19. A method of forming a headed thermoplastic tube as defined in claim 18, wherein all of the thermoplastic tubes produced are aligned in the same particular direction.

20. The method of forming a headed thermoplastic tube as defined in claim 18, wherein said material comprising said closure and said material comprising said thermoplastic sleeve are incompatible such that a heated preform mass on the exposed portion of said thermoplastic sleeve will not soften or melt said interior cavity of said closure causing said sleeve and said closure to adhere.

21. The method of forming a headed thermoplastic tube as defined in claim 20, wherein said material comprising said closure and said material comprising said thermoplastic sleeve have different melting temperatures.

22. In a method of forming a headed thermoplastic tube having a closure on its head from a longitudinally stretched, extruded thermoplastic sleeve having a continuous wall with inner and outer wall surfaces by:

positioning a longitudinally stretched, extruded thermoplastic sleeve over a forming mandrel having a head forming end, with an exposed portion of said longitudinally stretched, extruded thermoplastic sleeve having an open end extending beyond said head forming end;

heating the inner wall surface of said exposed portion of said longitudinally, stretched extruded thermoplastic sleeve by a heat source so that the heated exposed portion shrinks and thickens; and pressing the heated exposed portion into a mold cavity to form a head on said longitudinally stretched, thermoplastic sleeve;

the improvement which comprises:

pressing the heated exposed portion with sufficient force into a closure having an interior cavity formed by least a bottom wall and a side wall comprised of a material that is incompatible with the material from which said longitudinally stretched, extruded thermoplastic sleeve is comprised so as to form from said heated exposed portion a head on said thermoplastic sleeve to conform to the interior cavity of said closure; wherein said bottom wall contains an orifice-forming spike forming an orifice in said head during the formation of said head;

said side wall has a threaded portion forming cooperating threads on said head during the formation of said head; and the closure used during forming of said head functions as said mold cavity and also functions as the closure for the headed thermoplastic tube having a closure on its head such that the headed thermoplastic tube having a closure on its head is formed in a single pressing step.

\* \* \* \* \*